Figure 1:
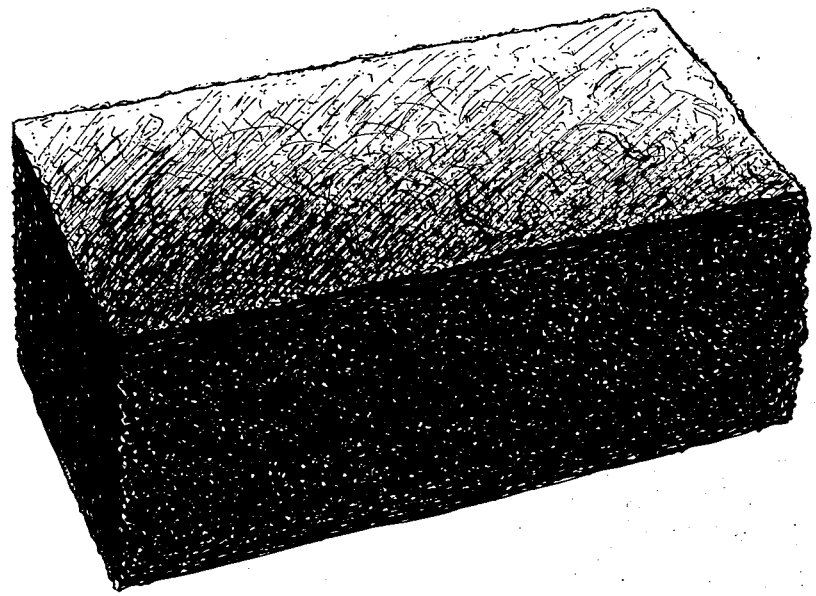

C. H. BENNETT, J. F. PALMER AND F. V. WEDLOCK.
HEAT INSULATING MATERIAL AND METHOD OF MAKING SAME.
APPLICATION FILED JUNE 18, 1920.

PARTIALLY COMPRESSED OUTER PORTION
EXPANDED INNER PORTION

Inventors:
Clark H. Bennett
John F. Palmer
Frank V. Wedlock
By Cheever & Cox
Attys.

UNITED STATES PATENT OFFICE.

CLARK H. BENNETT, OF CHICAGO, ILLINOIS, JOHN F. PALMER, OF ST. JOSEPH, MICHIGAN, AND FRANK V. WEDLOCK, OF CHICAGO, ILLINOIS, ASSIGNORS TO BENTEX COMPANY, OF CHICAGO, ILLINOIS, A CORPORATION OF ILLINOIS.

HEAT-INSULATING MATERIAL AND METHOD OF MAKING SAME.

1,371,016.      Specification of Letters Patent.      Patented Mar. 8, 1921.

Application filed June 18, 1920. Serial No. 389,848.

*To all whom it may concern:*

Be it known that we, CLARK H. BENNETT, residing at Chicago, Cook county, Illinois, JOHN F. PALMER, residing at St. Joseph, Berrien county, Michigan, and FRANK V. WEDLOCK, residing at Chicago, Cook county, Illinois, all citizens of the United States, have invented a certain new and useful Improvement in Heat-Insulating Materials and Methods of Making Same, of which the following is a specification.

Our invention relates to heat insulating materials and methods for producing the same, and the object of the invention is to provide a rigid, cellular material which shall be light in weight, comparatively inexpensive to produce, and possess heat insulating properties to a high degree. Another object is to produce a material of this character which will not become brittle at low degrees of temperature, for example, under conditions which normally obtain in refrigerating and cold storage plants. Another object is to provide a material which is repellent to moisture so far as the substance itself is concerned. Still another object is to provide a material structure well adapted to take and to keep at the surface, a coating of moisture excluding material whereby when thus coated the whole will be water proof.

Briefly considered, in carrying out the invention we make a dough having asphaltum as a basis, and mix with it rubber or rubber-like material together with sufficient sulfur for vulcanization. We also include some inert, refractory material such as a mixture of ground infusorial earth and magnesium carbonate. It is also desirable to introduce a softener to promote thorough mixture, for example, petroleum tailings, which is wax-like in consistency at ordinary room temperature and melts with the heat which, in practice, attends the mixing of the dough. We also include chemicals adapted, in the presence of heat and a slight degree of moisture, to develop gas for rendering the dough and resulting product cellular. After the dough has been prepared, it is introduced into a heating chamber where it is heated for a considerable period under pressure, but is not mechanically confined as in a mold. The chamber is then opened to the atmosphere and the treated dough withdrawn and preferably rolled, for example, by being passed between coöperating rollers, whereupon, after cooling, it will be found that the product is rigid, cellular, light in weight (in the neighborhood of one seventh the weight of an equivalent volume of water), tough at ordinary room temperature, and sufficiently tough at the ordinary temperatures of artificial refrigeration. It also has a high melting point and the substance of the material itself is non-absorptive of water. It is denser at and near the exposed surfaces than within the body of the mass and the exposed surfaces are so smooth, and the pores in them so small that they may be readily coated with a waterproofing material, which, practically speaking, will completely render the material moisture proof. The material is capable of withstanding a relatively high crushing strain and is not susceptible to any considerable degree to the fumes ordinarily employed in connection with artificial refrigeration—e. g. ammonia and carbon dioxid. The heat insulating coefficient is high, not only on account of the character of the ingredients employed, but also on account of the large amount of air contained within the cells, dead air being one of the best heat insulators known.

A further advantage of the product resulting from this process is that at, say 110 to 120 degrees, it becomes sufficiently plastic so that it may be bent and molded to unequal dimensions and irregular contours within small limits.

To produce the dough, excellent results may be obtained by employing the following ingredients substantially in the proportions mentioned, viz:

| | Per cent. |
|---|---|
| Asphaltum | 27.0 |
| Infusorial earth | 11.0 |
| Magnesium carbonate | 5.0 |
| Crude rubber (commercially known as brown crape) | 26.9 |
| Sulfur | 14.9 |
| Treated corn oil | 2.6 |
| Petroleum tailings | 5.8 |
| Bicarbonate of soda | 6.0 |
| Alum | .8 |
| | 100.0 |

The mixing of these ingredients may be performed in the following manner: While the type of apparatus is not essential, we employ a mill consisting of coöperating heated rollers, one of which is driven at a faster rate than the other, thereby tending to produce a heating and a shredding of the rubber with a resulting softening thereof, as well as a mixing action on all of the ingredients. As mills of this type are known no detailed description will be necessary. According to a suitable procedure, the crude rubber is first warmed up on the mill and the sulfur added to it, and the two worked sufficiently to insure even distribution. The petroleum tailings may be next added, then the asphaltum and vulcanized corn oil, then the magnesium carbonate and infusorial earth, then the preferably pre-mixed bicarbonate of soda and alum. Finally the whole mass is worked until thorough mixture is obtained. This mixing operation usually requires about an hour.

After the materials are thoroughly mixed the resulting dough is run out into a sheet or cake of suitable thickness, for example an inch or so, which may be cut into any desirable sizes or shapes. The pieces are then subjected to heat and pressure and for this purpose an open-steam vulcanizer may be employed. As such vulcanizers are well known, they need not be further described. We usually introduce the steam under a pressure in the neighborhood of 55 pounds per square inch, at approximately a temperature of 302° F. This heat and temperature is maintained for a period sufficient for vulcanization, usually about three hours, during which time gases are evolved in the body of the dough. These gases produce cells or bubbles which occur throughout the mass, causing expansion in all directions. When the heating period is completed, the hot and flexible sheet or slab is removed and promptly passed between a pair of rollers. The rollers compress the sheet and serve to rupture such of the cells as are not already intercommunicating. As a result either of the heating process or the reduction of pressure when the heating chamber is opened (or both) many of the cells expand to such a degree that the elastic limit of the cell walls is exceeded and the walls, especially of the inner cells, are apparently ruptured and hence rendered intercommunicating. The rolling process carries the rupturing of the cells still further, and it is our understanding that the rupturing of the cells admits the atmospheric air and enables the sheet to return to its maximum dimensions before finally cooling and becoming rigid. After the sheet has been rolled and cooled, it is found, upon examination, that most of the cells have been ruptured and that the portions near the surface have been partially condensed. The cells are smaller and the outer surfaces have been rendered smooth and skinlike and in admirable condition to receive a coating of waterproofing material. As the sheet leaves the rolls it is still pliable and it soon expands again—usually to a thickness at least three times the distance between the rolls. The sheet then soon hardens and acquires its final characteristics.

Figure 2:
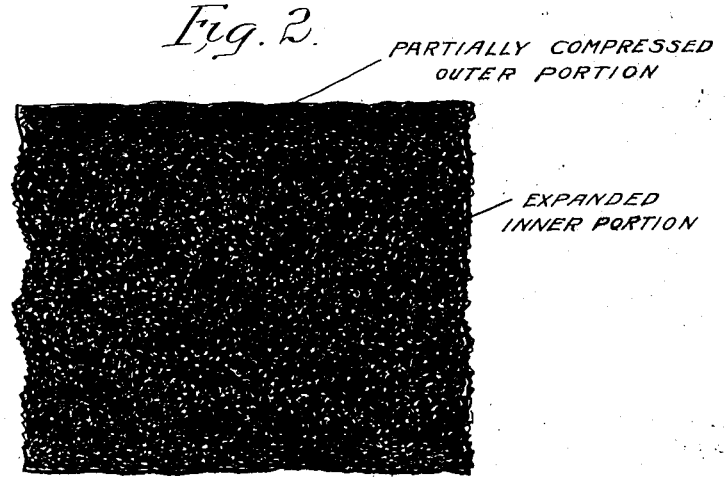

While it is difficult to accurately depict the finished article, the accompanying drawings will be suggestive, Figure 1 being a perspective view of a piece of finished material and Fig. 2 a vertical section thereof. By reference to these figures it will be seen that the inner cells are larger and more or less disrupted, while the ones nearer the top and bottom surfaces are smaller and that the surfaces themselves are comparatively smooth.

We have found it advantageous, in order to produce a sheet of predetermined thickness and surface, to finally cool the resulting sheet between opposed plates.

In describing the product as "rigid," we employ the term in the sense that at room temperature it will maintain its shape even though subjected to considerable compressive strain. There is, however, a measurable percentage of yielding before the elastic limit of the product will be exceeded and the cellular structure break down.

While we do not wish to be understood as positively representing our theories to be correct, it is, nevertheless, our understanding that the ingredients coöperate somewhat as follows: The rubber and sulfur elements of this compound are used simply to toughen and render capable of being fixed by vulcanization the extremely thin cellular walls made possible by the high ductility contributed by the asphalt as modified by the rubber. It is desirable to employ asphaltum having a rather low melting point, for example, 150° F. as this reduces the brittleness at low temperature, but in our process the asphalt is toughened and strengthened and therefore rendered usable by the rubber content. The corn oil employed is in the form of an oily solid, having been previously subjected to the action of heat and combined with sulfur, and while such treated corn oil is frequently referred to as a rubber substitute, it is our understanding that in this process its chief function is to promote mixing of the ingredients by rendering the mass more plastic and to thereby make it possible to readily incorporate more of the inert material. The magnesium carbonate and infusorial earth are inert and have high heat insulating coefficients. While different gas forming chemicals may be employed, this function is well performed by bicarbonate of soda and alum, it being probable that a slight amount of sulfuric acid is also produced which promotes the reaction, especially as a certain amount of moisture is always present in the various ingredients during the process of manufacture.

With respect to the weight of the final material, while this may vary somewhat, depending upon the experience and skill with which the rolling and other steps of the process are carried out, it is commercially possible to obtain a volume of about 215 or 220 cubic inches to the pound. This weight, compared with the weight of an equal volume of water, is approximately in the proportion of .137 to 1.

While the process, ingredients and proportions above mentioned produce a material having the advantageous characteristics mentioned, we do not wish to be specifically limited to them except to the extent indicated in the appended claims.

Having thus described our invention, what we claim as new and desire to secure by Letters Patent is:

1. A heat insulating material, cellular, rigid, at room temperature, and non-brittle at refrigerating temperatures, and composed of a vulcanizable asphalt base compound.

2. A compound for heat insulating material having as its basic elements asphalt, rubber and sulfur, and gas generating means intimately associated therewith prior to vulcanization.

3. A rigid, cellular, heat insulating material not considerably affected by low temperatures, and having a multitude of gas filled cells and containing asphaltum intimately mixed with rubberlike material, and vulcanized.

4. Heat insulating material adapted to maintain a toughness and rigidity at ordinary refrigerating temperatures and having a cellular structure and a relative weight less than .2 as compared to water, said material containing asphaltum, rubber and inert material, the whole vulcanized.

5. Heat insulating material capable of maintaining its rigidity at ordinary temperatures of artificial refrigeration, said material being cellular and comprising approximately 30% by weight of asphaltum, the remainder including rubber, a vulcanizing agent, and refractory, heat insulating material.

6. The product resulting from mixing with asphalt and rubber sufficient sulfur to vulcanize and stabilize the mass; the asphalt and rubber being in about equal proportions, and together constituting approximately one half the weight of the mixture, adding inert material and gas generating ingredients, vulcanizing the whole under pressure, then cooling the resulting mass.

7. The product resulting from mixing with asphalt and rubber a sufficient quantity of sulfur for vulcanization, the asphalt and rubber being in about equal proportions, and together constituting at least one half the weight of the mixture, adding inert material amounting to about sixteen per cent. of the mixture, adding gas generating ingredients to about seven per cent. of the mixture, subjecting the mixture to heat and pressure sufficient for vulcanization and to generate gas, rolling the material while still hot and flexible, and then permitting the resulting sheet to cool.

8. The product resulting from mixing with asphalt and rubber a sufficient quantity of sulfur for vulcanization, adding refractory material together with gas forming chemicals, subjecting the mixture to heat and gas pressure sufficiently to vulcanize the mass and generate gas, then releasing the external pressure to permit the material to swell, and promptly rolling the material while hot, and finally permitting the resulting sheet to cool at atmospheric pressure.

9. The herein described method of producing rigid cellular, heat insulating sheets adapted to remain tough at ordinary temperatures of artificial refrigeration, the method consisting in mixing asphaltum with rubberlike material in approximately equal proportions, adding sulfur to an extent sufficient for vulcanization, adding gas forming chemicals and at least 12% inert, refractory material, heating the mixture under pressure for a period sufficient for vulcanization, suddenly releasing the pressure and promptly passing the material through a pair of rolls adapted to compress it to about one-third its ultimate thickness, and finally permitting the resulting sheet to cool.

10. The herein described method of producing rigid, cellular, heat insulating material consisting in producing a dough at least one quarter of which, by weight, is asphaltum, adding an approximately equal amount of rubberlike material, adding sulfur to approximately one half the amount by weight of the rubberlike material, adding refractory, heat insulating material, adding gas forming chemicals, subjecting the mixture to steam at a temperature of approximately 302° F., rolling the material while hot, and finally cooling the mixture at atmospheric pressure.

11. The herein described method of producing rigid, cellular, heat insulating material consisting in producing a dough having per hundred pounds approximately the following ingredients and proportions, viz.,

| | Pounds. |
|---|---|
| Asphaltum | 27.0 |
| Infusorial earth | 11.0 |
| Magnesium carbonate | 5.0 |
| Crude rubber | 26.9 |
| Sulfur | 14.9 |
| Sulfur treated corn oil | 2.6 |
| Petroleum tailings | 5.8 |
| Bicarbonate of soda | 6.0 |
| Alum | .8 |
| | 100.0 | heating the mixture under pressure for a period and to a degree sufficient for vulcanization, rolling the material while still hot and finally cooling it.

12. The herein described method of producing cellular, heat insulating material consisting in producing a dough having per hundred pounds approximately the following ingredients and proportions, viz.,

| | Pounds. |
|---|---|
| Asphaltum | 27.0 |
| Infusorial earth | 11.0 |
| Magnesium carbonate | 5.0 |
| Crude rubber | 26.9 |
| Sulfur | 14.9 |
| Sulfur treated corn oil | 2.6 |
| Petroleum tailings | 5.8 |
| Bicarbonate of soda | 6.0 |
| Alum | .8 |
| | 100.0 | and subjecting the mixture to a steam pressure at approximately 302° F. for a period of approximately three hours, rolling while hot, and finally cooling the mixture at atmospheric pressure.

13. The herein described method of producing rigid, cellular, heat insulating sheets adapted to remain tough at ordinary temperatures of artificial refrigeration, the method consisting in mixing asphalt and rubber with sufficient sulfur for vulcanization, the mixture also including gas forming chemicals and inert material, subjecting the mixture to heat and pressure, removing the material to the open atmosphere, rolling it and finally configurating it between opposed plates.

14. The method of producing rigid, cellular, heat insulating sheets consisting in mixing asphalt, rubber, inert material, gas forming chemicals, softening material for promoting mixing, and a vulcanizing agent, subjecting the mass to sufficient temperature and pressure for vulcanization, rolling the material while hot, and cooling between opposed plates.

15. As a new article of manufacture, a rigid, cellular, heat insulating material having as its basic elements asphaltum and rubber with sufficient sulfur for vulcanization, the article being in the form of a sheet which is of greater density at the surface than in the interior.

16. The herein described method of producing a cellular, heat insulating material, rigid at room temperatures and non-brittle at refrigerating temperatures, consisting in preparing a compound having an asphaltic base with sufficient sulfur to vulcanize the mass, introducing gas forming chemicals, heating the mass to produce a cellular structure, and permitting the mass to cool and set prior to the collapse of the cells.

17. The herein described method of producing a cellular, heat insulating material, rigid at room temperatures and non-brittle at refrigerating temperatures, consisting in preparing a compound having an asphaltic base with sufficient sulfur to vulcanize the mass, introducing gas forming chemicals, heating the mass to produce a cellular structure, disrupting the cells for admitting the atmosphere and cooling the mass, thus preventing collapse of the mass.

In witness whereof we have hereunto subscribed our names.

CLARK H. BENNETT.
JOHN F. PALMER.
FRANK V. WEDLOCK.